Figure 3:
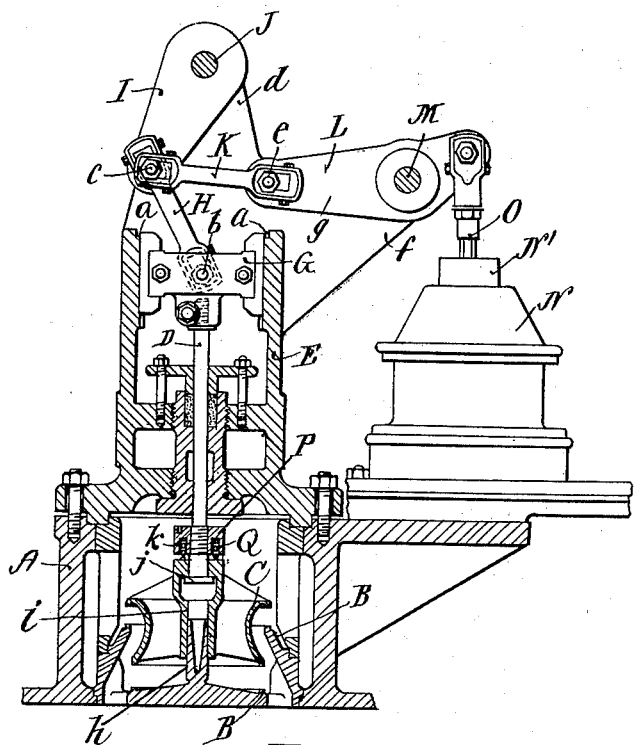

No. 737,495. PATENTED AUG. 25, 1903.
J. W. SARGENT, R. H. RICE & W. O. TOURGEE.
VALVE GEAR FOR STEAM ENGINES.
APPLICATION FILED JAN. 2, 1903.
NO MODEL. 2 SHEETS—SHEET 1.
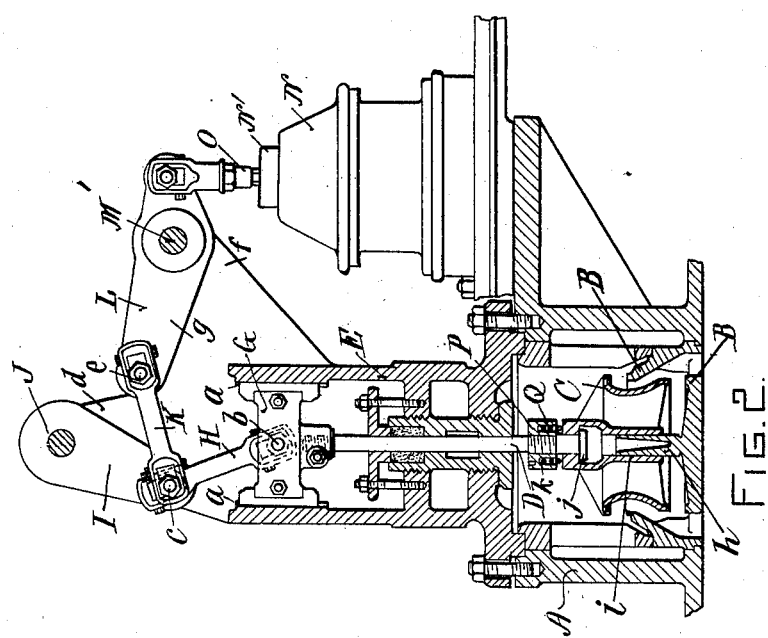
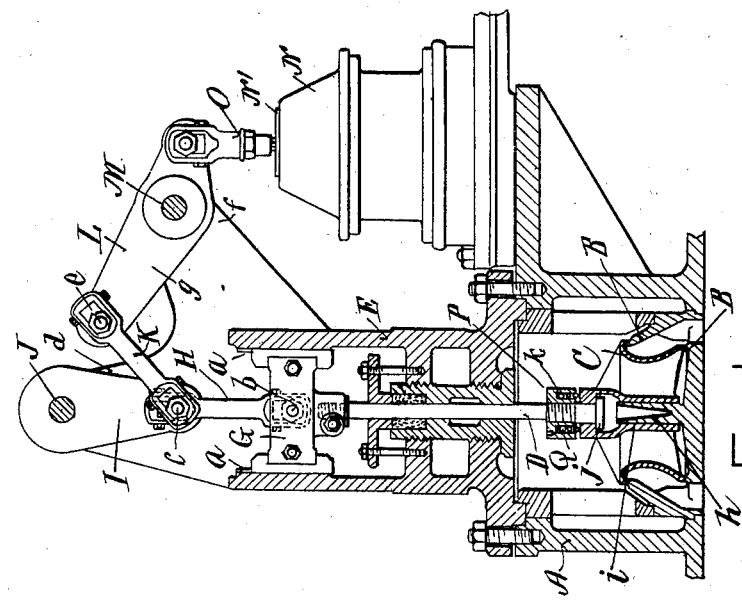
WITNESSES
INVENTORS.
John W. Sargent
Richard H. Rice
William O. Tourgee
BY
S. Scholfield
ATTY.

No. 737,495. PATENTED AUG. 25, 1903.
J. W. SARGENT, R. H. RICE & W. O. TOURGEE.
VALVE GEAR FOR STEAM ENGINES.
APPLICATION FILED JAN. 2, 1903.
NO MODEL. 2 SHEETS—SHEET 2.

WITNESSES

INVENTORS:
John W. Sargent
Richard H. Rice
William O. Tourgee

BY
S. Schofield ATTY.

No. 737,495.

Patented August 25, 1903.

UNITED STATES PATENT OFFICE.

JOHN W. SARGENT, RICHARD H. RICE, AND WILLIAM O. TOURGEE, OF PROVIDENCE, RHODE ISLAND, ASSIGNORS TO PROVIDENCE ENGINEERING WORKS, OF PROVIDENCE, RHODE ISLAND.

VALVE-GEAR FOR STEAM-ENGINES.

SPECIFICATION forming part of Letters Patent No. 737,495, dated August 25, 1903.

Application filed January 2, 1903. Serial No. 137,573. (No model.)

*To all whom it may concern:*

Be it known that we, JOHN W. SARGENT, RICHARD H. RICE, and WILLIAM O. TOURGEE, citizens of the United States, and residents of Providence, in the State of Rhode Island, have invented a new and useful Improvement in Valve-Gear for Steam-Engines, of which the following is a specification.

Our invention relates to an improvement in the inlet-valve gear of an engine; and it consists in a lever-and-link movement for causing the slow motion of a puppet-valve when closing the same upon its seat, so as to prevent the slamming of the valve, and also for producing a comparatively slight rising movement of the valve during the terminal portion of its elevation, whereby a considerable opening of the valve may be obtained for an early cut-off, with very little increase of opening for a late cut-off.

In the accompanying drawings, Figure 1 represents a vertical section of the steam-chest and an axial section of the puppet-valve closed upon its seat. Fig. 2 represents the same with the puppet-valve raised from its seat to an intermediate position. Fig. 3 represents the same with the valve at its highest elevation.

In the drawings, A represents the steam-chest; B, the steam-inlet double-valve seat; C, the inlet puppet-valve, and D the valve-stem, which is provided with the cross-head G, held in the guides $a$ $a$ of the valve-chest bonnet E. The link H is pivoted at one end to the cross-head G by means of the pin $b$ and at the other end to the rocker-arm I by means of the pin $c$, the said rocker-arm being loosely held upon the fixed stud J, which projects from the vertical arm $d$ of the bonnet E. To the pin $c$ of the rocker-arm I is also pivoted the link K, the opposite end of the said link being connected to the pin $e$, which projects from the side of the rocking lever L, the said rocking lever being keyed to the valve-gear rock-shaft M, which is to be driven by means of an eccentric and releasing-gear and has a bearing in the horizontal arm $f$ of the bonnet E, and from the outer end of the lever L connection is made with the plunger N' of the dash-pot N by means of the link O, the said dash-pot being firmly bolted to a plate extending outward from the top of the steam-chest.

The valve-seat B is provided with the centrally-arranged guide $h$, and the valve C is provided with the bearing-cavity $i$, which loosely fits the said guide, and the said valve is loosely connected to the valve-stem D and retained thereon by means of the collar $j$, and above the valve C, upon the valve-stem, is secured the collar P, provided with the annular recess $k$, within which is placed the spiral spring Q, which serves to hold the valve C down against the collar $j$ and is adapted to yield to the slight downward movement of the valve-stem after the valve has reached its seat.

The closed position of the valve C is shown in Fig. 1, the arm $g$ of the rocking lever L of the valve-gear being shown at its highest position, and in Fig. 2 the position of the valve is shown when the arm $g$ has been lowered to its intermediate position, and in Fig. 3 the position of the valve is shown when the arm $g$ has been brought down to its lower position, and from inspection of the position of the valve $c$, as shown in these figures of the drawings, it will be seen that the lower half of the opening movement of the valve will be rapidly effected, while the upper half of the opening movement will be very slow, and also that the terminal closing of the valve to its seat will be likewise comparatively slow, thus constituting a very desirable movement for the puppet-valve of an engine.

We claim as our invention—

In an inlet-valve gear, the combination of the puppet-valve, the valve-stem, the pivoted rocking arm, and the link which connects the valve-stem with the rocking arm, with the rocking lever of the valve-gear, the link connecting the rocking lever with the pivoted rocking arm, and the dash-pot arranged in operative connection with the rocking lever, substantially as described.

JOHN W. SARGENT.
RICHARD H. RICE.
WILLIAM O. TOURGEE.

Witnesses:
SOCRATES SCHOLFIELD,
RICHARD A. ROBERTSON.